United States Patent
Kato et al.

(10) Patent No.: US 9,114,651 B2
(45) Date of Patent: Aug. 25, 2015

(54) RECORDING APPARATUS AND COLOR MEASURING METHOD FOR RECORDING APPARATUS

(71) Applicant: CANON KABUSHIKI KAISHA, Tokyo (JP)

(72) Inventors: Masataka Kato, Yokohama (JP); Tsuyoshi Ibe, Yokohama (JP); Masaya Uetsuki, Yokohama (JP); Toshimitsu Danzuka, Tokyo (JP); Taku Yokozawa, Yokohama (JP); Asako Tomida, Kawasaki (JP); Shin Genta, Yokohama (JP); Hiroaki Komatsu, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/857,414

(22) Filed: Apr. 5, 2013

(65) Prior Publication Data

US 2013/0286078 A1 Oct. 31, 2013

(30) Foreign Application Priority Data

Apr. 27, 2012 (JP) ................................. 2012-103706

(51) Int. Cl.
| | |
|---|---|
| B41J 29/393 | (2006.01) |
| B41J 2/165 | (2006.01) |
| B41J 11/00 | (2006.01) |
| H04N 1/60 | (2006.01) |

(52) U.S. Cl.
CPC .............. B41J 29/393 (2013.01); B41J 11/002 (2013.01); H04N 1/6036 (2013.01); B41J 2002/16573 (2013.01)

(58) Field of Classification Search
None
See application file for complete search history.

(56) References Cited

U.S. PATENT DOCUMENTS

| | | | |
|---|---|---|---|
| 6,447,095 B1 | 9/2002 | Kanda et al. | |
| 6,527,361 B1 | 3/2003 | Gotoh et al. | |
| 6,557,969 B1 | 5/2003 | Murakami et al. | |
| 6,644,777 B2 | 11/2003 | Danzuka | |
| 6,702,421 B2 | 3/2004 | Inui et al. | |
| 6,719,400 B2 | 4/2004 | Inui et al. | |
| 6,752,485 B2 | 6/2004 | Murakami et al. | |

(Continued)

FOREIGN PATENT DOCUMENTS

JP 2008-254221 A 10/2008

OTHER PUBLICATIONS

Machine Translation of JP 2008-254221.*

*Primary Examiner* — Lisa M Solomon
(74) *Attorney, Agent, or Firm* — Fitzpatrick, Cella, Harper & Scinto (57) ABSTRACT

A recording apparatus includes: a recording unit for applying ink on a sheet by a printing head; a drying unit for drying the sheet; a measuring unit for measuring patterns on the sheet; a conveying unit for conveying the sheet; a recovering unit for performing a printing head-recovering operation; and a control unit for controlling the apparatus such that, the recording apparatus performs recording to form patterns, the conveying unit performs first conveying to convey the sheet from a recording region to a drying region, the drying unit performs drying, the conveying unit performs second conveying to convey the sheet from the drying region to a measuring region, and the measuring unit performs measuring, in sequence, wherein the recovering operation is performed at timing at least partially overlapping at least one of the first and second conveying operations, the drying operation, and the color measuring operation, after the recording operation.

10 Claims, 10 Drawing Sheets

(56) References Cited

U.S. PATENT DOCUMENTS

| | | |
|---|---|---|
| 6,854,826 B2 | 2/2005 | Kanda et al. |
| 6,984,018 B2 | 1/2006 | Uetsuki et al. |
| 7,503,638 B2 | 3/2009 | Sato et al. |
| 7,527,348 B2 | 5/2009 | Uetsuki et al. |
| 8,342,626 B2 | 1/2013 | Kawamata et al. |
| 2002/0135627 A1* | 9/2002 | Takahashi et al. ............. 347/19 |
| 2010/0225683 A1* | 9/2010 | Yamashiro ..................... 347/1 |
| 2012/0188304 A1 | 7/2012 | Ibe et al. |
| 2013/0093815 A1 | 4/2013 | Kawamata et al. |
| 2013/0257971 A1* | 10/2013 | Eiyama ........................ 347/19 |

* cited by examiner

RECORDING APPARATUS AND COLOR MEASURING METHOD FOR RECORDING APPARATUS

BACKGROUND OF THE INVENTION

1. Field of the Invention

The present invention relates to a recording apparatus provided with a color measuring device for measuring color patterns recorded on a sheet by ejecting ink on the sheet from a printing head, and a color measuring method in the recording apparatus.

2. Description of the Related Art

There is known an inkjet recording apparatus in which, for obtaining a desired color reproduction, the color image having been recorded is measured, a color calibration is performed based upon the measured data, and the result is reflected in the subsequent image record data. At this time, a process is generally performed that comprises a step for recording on a sheet color patterns in each of which color patches each having ink of each color are arrayed in a lattice shape, a step for drying the color patterns, and next a step for moving a color measuring sensor in a width direction of the sheet to measure the color patterns one row by one row.

Japanese Patent Laid-Open No. 2008-254221, as the structure for shortening the time from recording completion to color measuring start, discloses a recording apparatus provided with a color measuring device in which a recording component, a color measuring component, and a drying component are arranged in that order in the conveying direction of a sheet, and proposes a sequence of recording, drying, and color measuring operations based upon this apparatus.

A color of an image on a sheet on which ink has been applied can change depending on the drying degree of the ink until the drying degree of the ink is increased to some extent to become stable. To obtain the desired color reproduction by performing a color calibration with high accuracy, it is desired to appropriately set the time from recording completion to color measuring start to make the drying degree of the ink at color measuring constant.

Incidentally it is known that in the inkjet recording apparatus, to prevent or improve an ejection defect caused by the clogging or the like of ink ejection openings provided in an inkjet head or ink stains on a surface of the inkjet head, a recovering operation of the inkjet head is performed. It is possible to successively perform more stable image formation by performing the recovering operation. Japanese Patent Laid-Open No. 2008-254221 discloses the sequence of the recording, drying, and color measuring operations, but has no description referring to the recovering operation of the inkjet head with the aim at maintaining the stable ejection performance of the inkjet head.

SUMMARY OF THE INVENTION

An object of the present invention is to appropriately set the time from recording completion to color measuring start of color patterns in consideration of performing the recovering operation for more stable color pattern formation.

To achieve the above object, a recording apparatus of the present invention comprises a recording unit configured to apply ink on a sheet by a printing head to perform recording; a drying unit configured to dry the sheet on which recording was performed by the recording unit; a measuring unit configured to measure colors of color patterns on the sheet; a conveying unit configured to convey the sheet; a recovering unit configured to perform a recovering operation for the printing head; and a control unit configured to control the apparatus such that the recording apparatus performs a recording operation to form color patterns, the conveying unit performs a first conveying operation to convey the sheet from a recording region of the recording unit to a drying region of the drying unit, the drying unit performs a drying operation, the conveying unit performs a second conveying operation to convey the sheet from the drying region to a measuring region of the measuring unit, and the measuring unit performs a measuring operation, in sequence, wherein the recovering operation is performed at timing after the recording operation and at least partially overlapping at least one of the first and second conveying operations, the drying operation, and the color measuring operation.

According to the present invention, the recovering operation of the printing head is performed at timing after completion of the recording operation of the color pattern and at least partially overlapping at least one of the conveying operation, the drying operation, and the color measuring operation of the sheet. Therefore it is possible to appropriately set the time from the recording completion to the color measuring start of the color pattern.

Further features of the present invention will become apparent from the following description of exemplary embodiments (with reference to the attached drawings).

DESCRIPTION OF THE EMBODIMENTS

Hereinafter, preferred embodiments according to the present invention will be explained in detail with reference to the accompanying drawings.

Recording Apparatus

Figure 1A:
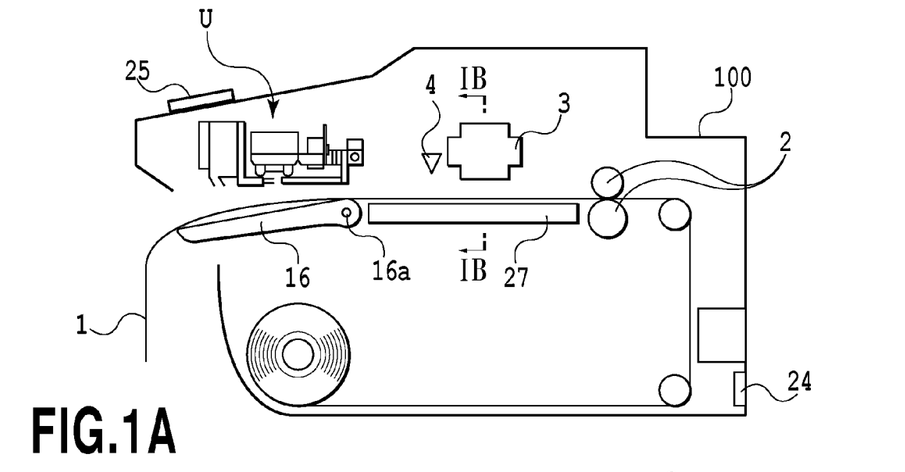
FIG. 1A is an entire schematic diagram showing a recording apparatus according to a first embodiment.

FIG. 1A is a schematic diagram showing a recording apparatus according to an embodiment in the present embodiment. The recording apparatus 100 is a serial scan type printer of an inkjet method in which an inkjet head 3 as a printing head scans in a main scan direction crossing a conveying direction (sub scan direction) of a sheet 1, and ink is ejected on the sheet 1 from the inkjet head 3 to form an image thereon.

The sheet 1 is set in the recording apparatus 100 in the form of a paper roll. As a command of a recording start is input to the recording apparatus 100 from an operation panel 25, the sheet 1 is conveyed in a sheet conveying direction (sub scan direction) by tight sandwich and rotation by pair conveying rollers 2. As the sheet 1 is conveyed to a recording region of the inkjet head 3, the sheet 1 is held by a platen 27, while ink ejected from the inkjet head 3 according to record data is applied on a surface of the sheet 1 to record color patterns for color measuring. The sheet 1, on which the color patterns for color measuring are recorded, is next conveyed to a drying region by a measuring unit U mounted to the recording apparatus 100, and is dried therein. After that, the sheet 1 is conveyed to a color measuring region by the measuring unit U to be subjected to the color measuring. After completion of the color measuring, the sheet 1 is cut by a cutter 4 to be separated from the paper roll, and is discharged from the recording apparatus 100 under its own weight with rotation of a discharge guide 16.

Recovering Unit

Figure 1B:
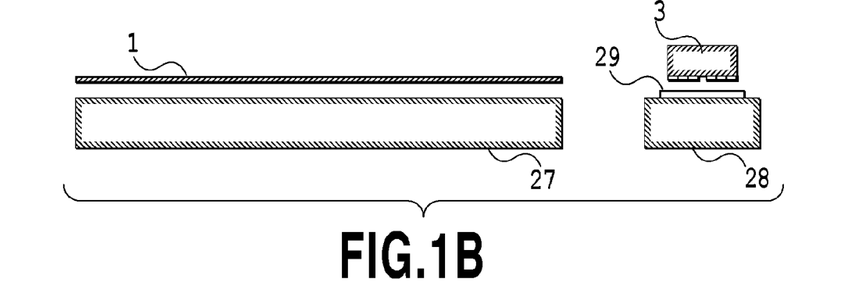
FIG. 1B is a section schematic diagram explaining a part of an internal configuration of the recording apparatus.

Next, an explanation will be made of a configuration example and a recovering operation of the recovering unit of the recording apparatus according to the first embodiment in the present invention. FIG. 1B is a section schematic diagram showing a partial internal mechanism of the recording apparatus, taken by lines IB-IB shown in FIG. 1A.

The inkjet head 3 stops in a home position or a back position as needed before starting a recording operation or during the recording operation. In the present specification, the home position means one of both side positions of the platen 27 in which the inkjet head 3 is out of the platen 27 in the main scan direction at the time of moving the inkjet head 3 in the main scan direction. Likewise the back position means the other position at the opposite to the home position in such a manner as to put the platen 27 between the home position and the back position in the main scan direction. FIG. 1B shows a state where the inkjet head 3 is in a home position. A recovering unit 28 including caps and a wiper is arranged as a recovering unit for normalizing the inkjet head 3 in the vicinity of the home position.

Figure 1C:
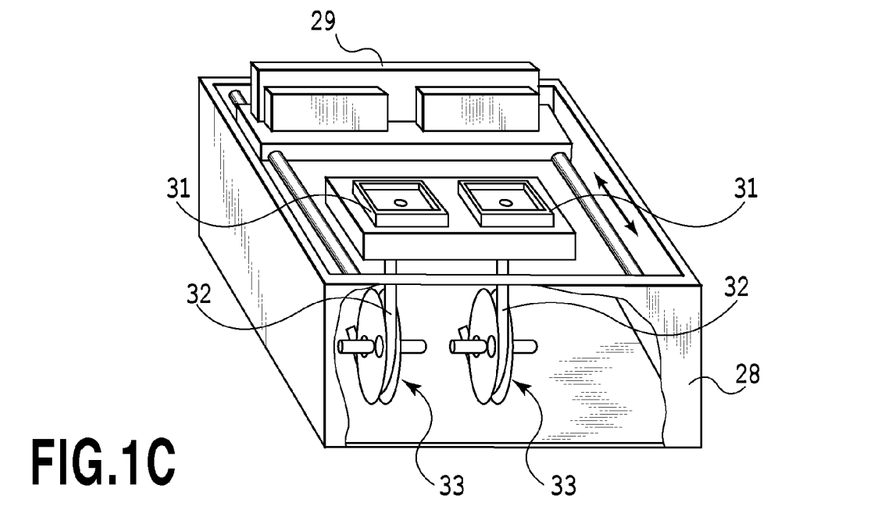
FIG. 1C is a schematic perspective view showing a recovering unit of the recording apparatus.

FIG. 1C is a schematic perspective view showing a configuration example of the recovering unit 28 shown in FIG. 1B. Caps 31 are supported by an elevating mechanism (not shown) to be capable of elevating. At an up position thereof, capping is performed for each face of, for example, three ejection portions in the inkjet head 3 to perform protection or suction recovery of the ejection portion during a non-recording operation or the like. During a recording operation, the cap 3 is set to a down position of avoiding interference with the inkjet head 3, and opposes the face to receive preliminary ejection. In addition, to wipe out the ink adhered to the face, wiping for rubbing the face by a rubber wiper 29 is performed.

Suction pumps 33, in a state where the cap 31 is jointed to the face of the inkjet head 3 to form a sealed space therebetween, respectively produce a vacuum inside the seal space. Therefore ink can be filled in the inkjet head 3 and in the ejection portion from an ink tank (not shown), and dust, adherents, air bubbles and the like present in an ejection opening or an ink passage inward thereof can be suctioned for removal. In an illustrated example, the suction pump 33 in the form of a tube pump is used. The suction pump 33 comprises a member having a curved surface for holding at least a part of a flexible tube 32 along the curved surface, rollers capable of pressing the flexible tube 32 toward the member, and a rotatable roller support portion supporting the rollers. That is, the rollers squeeze the flexible tube on the curved surface forming member while rotating, with rotation of the roller support portion in a predetermined direction. Following it, a vacuum is produced in the sealed space formed by the cap 31 to suction the ink from the ejection opening, and the ink is suctioned into the tube or the suction pump from the cap 31. On the other hand, the suctioned ink is further carried toward an appropriate member (for example, a waste ink absorber (not shown)).

In addition, the suction pump 33 can be operated not only for performing the aforementioned suction recovery but also for discharging the ink received in the cap 31 by a preliminary ejection operation performed in a state where the cap 31 opposes the face. That is, when the preliminarily ejected ink retained in the cap 31 reaches to a predetermined amount, the suction pump 33 is operated. Thereby the ink retained in the cap 31 can be carried through the tube 32 to the waste ink absorbent.

Measuring Unit

Figure 2:
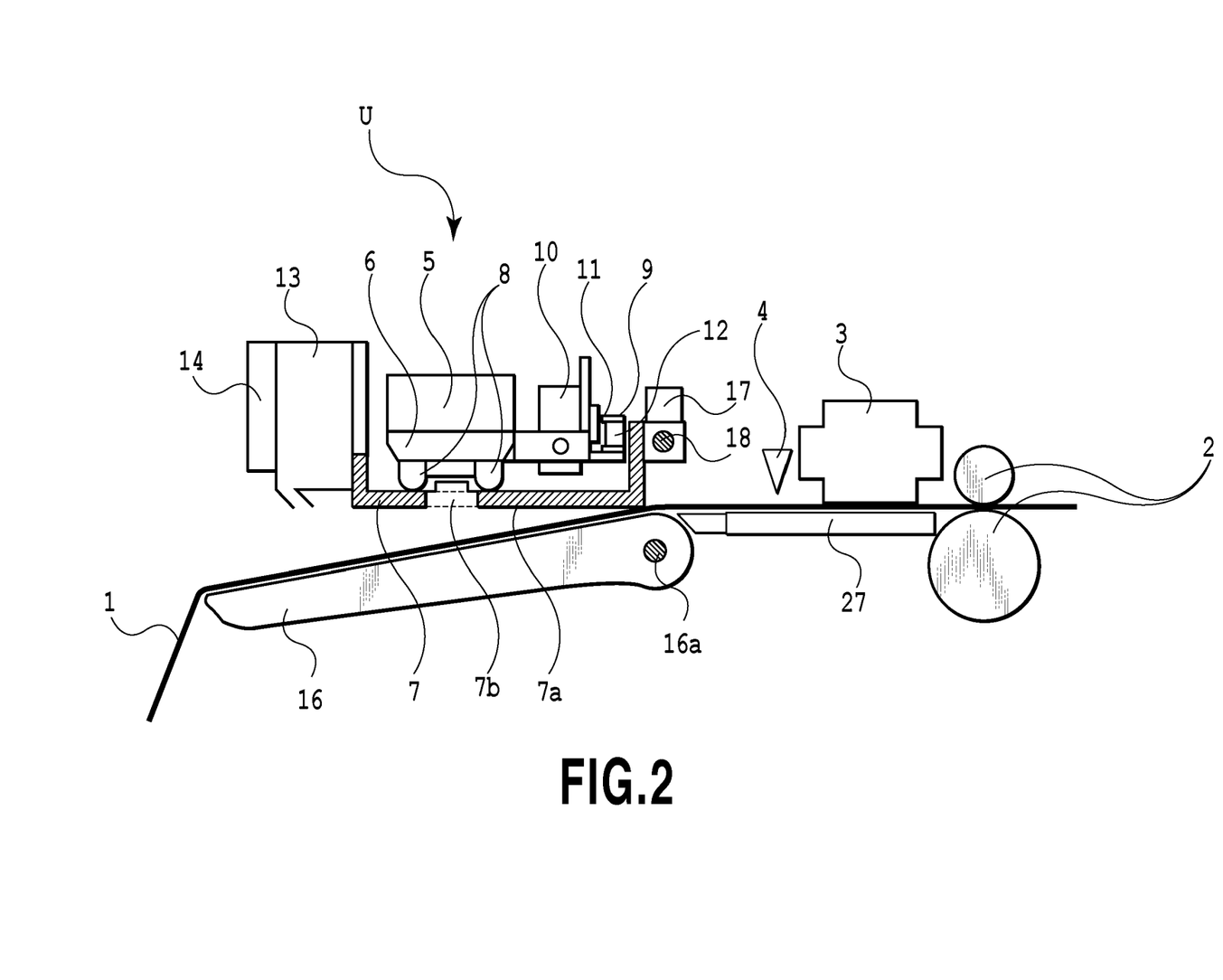
FIG. 2 is a cross section showing an example of an internal configuration of the recording apparatus according to the first embodiment.

FIG. 2 is a cross section showing an example of an internal configuration of the recording apparatus according to the first embodiment in the present invention. A measuring unit according to the present embodiment will be explained with reference to FIG. 2.

In the present recording apparatus, a color measuring sensor 5, a sensor retaining element 6, a support plate 7, sliding members 8, a belt 9, a motor 10, a motor pulley 11, an idler pulley 12, a drying duct 13 and a blower fan 14 are all integrally mounted. In the present specification, this integral configuration is called a measuring unit U or a reading unit.

In the measuring unit U, the color measuring sensor 5 for quantitatively measuring colors of the color patterns or reading other type of patterns formed on the sheet is retained by the sensor retaining element 6. The sensor retaining element 6 is connected to the support plate 7 in such a manner that the sliding members 8 provided on the bottom surface of the sensor retaining element 6 make contact with the support plate 7. In addition, the looped belt 9 engaged to the sensor retaining element 6 is bridged with tensions across between the motor pulley 11 and the idler pulley 12, and the sensor retaining element 6 is movable in the sheet width direction by the motor 10. At the moving of the sensor retaining element 6, posture accuracy between a pressing face 7a of the support plate 7 and the color measuring sensor 5 is maintained through the support plate 7, the sliding members 8 and the sensor retaining element 6.

A discharge guide 16 is installed directly under the support plate 7. The sheet 1 is conveyed through an opening portion between the pressing face 7a and the discharge guide 16. The color measuring sensor 5 scans in the sheet width direction on the support plate 7, and performs a color measuring operation to the sheet 1 through a slit 7b provided in the support plate 7.

The drying duct 13 and the blower fan 14 with a variable wind speed are provided downstream of the color measuring sensor 5 in the sheet conveying direction. The wind generated by the blower fan 14 is sent to the drying duct 13, and the wind blown out from the drying duct 13 is uniformly sprayed out to the surface of the sheet 1 on which the color pattern for color measuring is recorded, to speed up the drying of the color pattern for color measuring.

As explained above, the measuring unit in the present embodiment has both a function of the color measuring device and a function of the drying device. However, the configuration of the measuring unit which can be applied to the present embodiment is not limited thereto, and may allow the configuration where the color measuring device and the drying device are separately provided in the recording apparatus 100.

Next, an explanation will be made of a series of recording, drying, color measuring, and sheet discharging operations with reference to FIG. 3A to FIG. 3C and a color measuring sequence in FIG. 4.

The sheet 1 is intermittently conveyed in the sheet conveying direction (hereinafter, called a discharge direction) toward the discharge guide 16 in a state of being sandwiched and held by the pair conveying rollers 2, and in the meanwhile, the recording of a pattern row P constituting the color pattern for color measuring is performed by the inkjet head 3 (step S101 in FIG. 4).

Figure 3A:
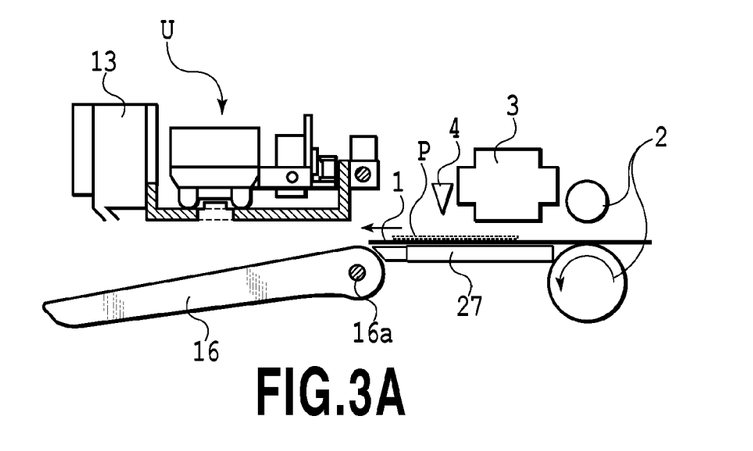
FIG. 3A is a diagram explaining a series of recording, drying, color measuring, and sheet discharging operations by the configuration in FIG. 2.

FIG. 3A shows a state of the internal configuration in the recording apparatus in a point where the recording of the pattern row P is completed. A front end of the sheet 1 is conveyed in the discharge direction along a platen 27 and the discharge guide 16 by a length in the sheet conveying direction of the recorded pattern row P. The sheet 1 on which the recording is completed is next further is conveyed in the discharge direction, and is, as shown in FIG. 3B, stopped in a point where a rear end of the pattern row P, that is, an upstream end thereof in the discharge direction enters into a drying possible region of the drying duct 13 (step S102 in FIG. 4). Here, the blower fan of the drying duct 13 is made to be operated to dry the pattern row P for a predetermined time (step S103 in FIG. 4).

Figure 3B:
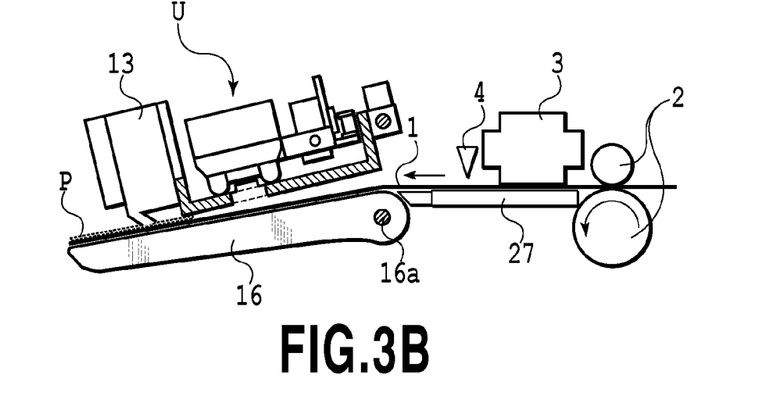
FIG. 3B is a diagram explaining a series of recording, drying, color measuring, and sheet discharging operations by the configuration in FIG. 2.
Figure 3C:
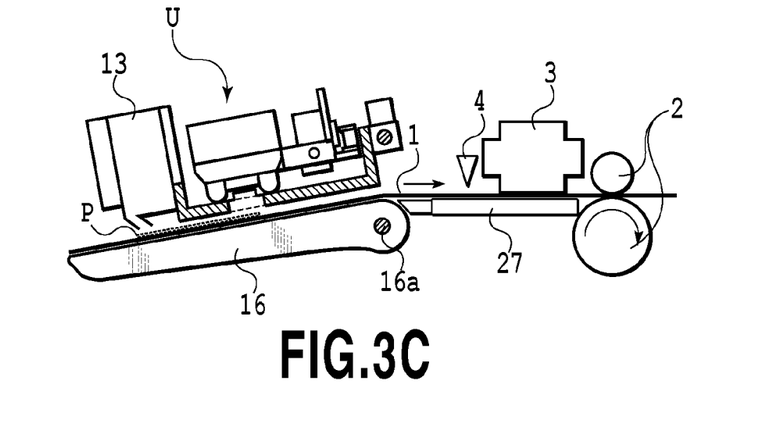
FIG. 3C is a diagram explaining a series of recording, drying, color measuring, and sheet discharging operations by the configuration in FIG. 2.
Figure 4:
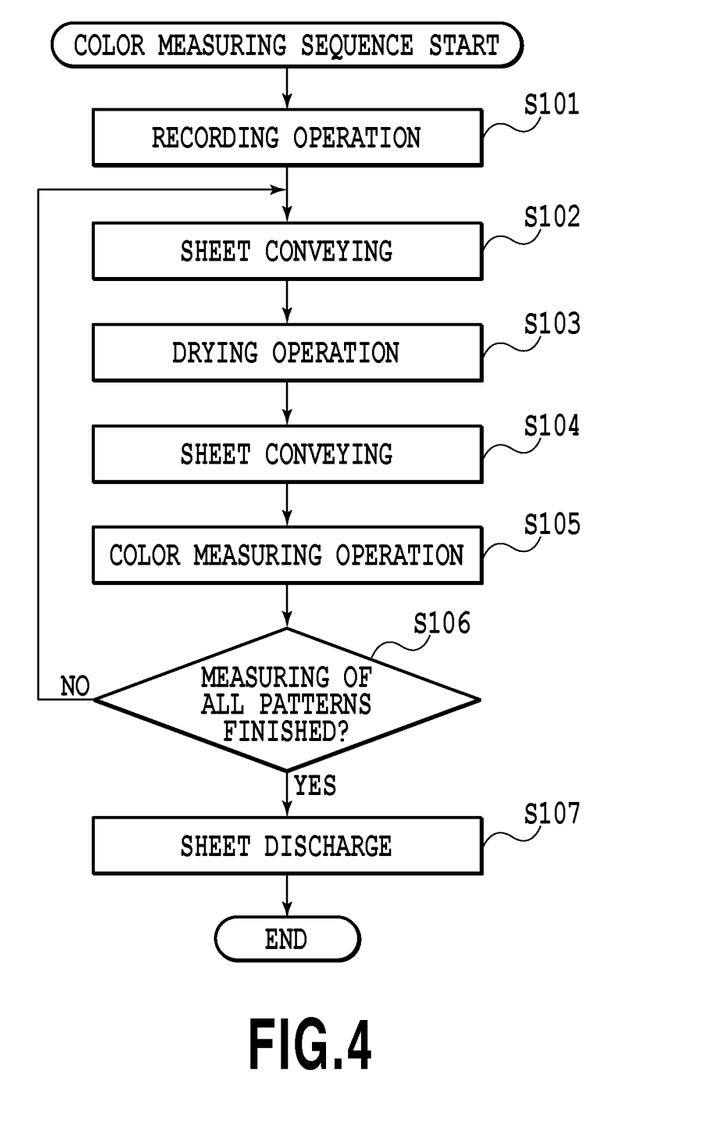
FIG. 4 is a flow chart showing an outline of a color measuring sequence according to the configuration in FIG. 2.

Next, as shown in FIG. 3C, the sheet 1 is conveyed upstream in the sheet conveying direction in reverse to the previous direction, and is stopped in a point where an upstream end of the dried pattern row P in the discharge direction comes directly under the color measuring sensor (step S104 in FIG. 4). Here, the color measuring sensor is operated to scan the sheet in the width direction to perform the color measuring of the pattern row P (step S105 in FIG. 4). In a case where the color pattern for color measuring comprises a plurality of pattern rows P, the color measuring is performed one row by one row, and a required intermittent conveyance is performed between the color measuring operations of the respective pattern rows P.

In a case where the plurality of pattern rows P are recorded over a length of the drying region of the drying duct 13 in the sheet conveying direction, the drying operation explained in FIG. 3B and the color measuring operation explained in FIG. 3C are repeated to the not-dried pattern row P.

After the color measuring operation is completed (step S106 in FIG. 4), the sheet 1 is cut by the cutter 4, and is discharged from the recording apparatus toward the inside of a basket (not shown) provided downward thereof under its own weight with rotation of the sheet discharge guide 16 around an axis 16a thereof (step S107 in FIG. 4).

Control System

Figure 5:
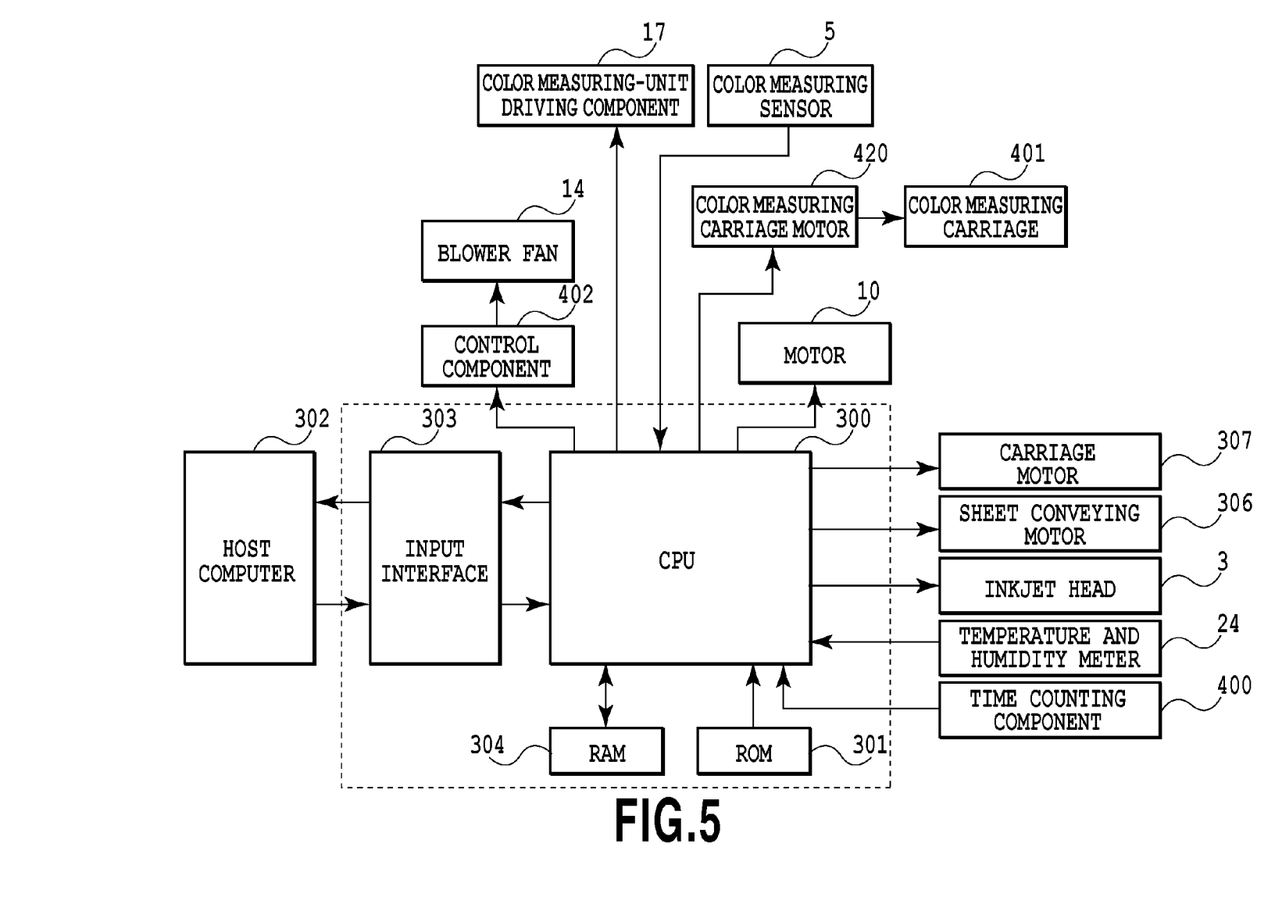
FIG. 5 is a block diagram showing a configuration example of a control system in the recording apparatus according to the first embodiment.

FIG. 5 is a block diagram showing a configuration example of a control system of the recording apparatus according to the first embodiment in the present invention.

The recording apparatus according to the present embodiment includes a primary control component configured to include a CPU 300, a ROM 301, an input interface 303 and a RAM 304.

The CPU 300 controls the entirety of recording, drying, color measuring, and conveying operations according to control programs stored in the ROM 301. In detail, the CPU 300 controls the inkjet head 3, a sheet conveying motor 306, a carriage motor 307, the motor 10, a control component 402 of the blower fan 14, a measuring unit driving component 17 and the like. The control of them is performed based upon record data and record mode setting information from a host computer 302, time information from a time counting component 400 for counting an elapse time after the recording is completed, temperature and humidity information from a temperature and humidity meter 24, and color measuring data from the color measuring sensor 5.

Input of the record data, the record mode setting information and the like to the CPU 300 from the host computer 302 is made through the input interface 303. In addition, the CPU 300 can write and read out the record data and the like in and from the RAM 304. The CPU 300 determines record control according to the record mode setting information, and starts the recording. The recording is performed in such a manner that the carriage motor 307 is driven to cause the carriage having mounted the inkjet head 3 thereon to scan the sheet in the width direction, and ink to be ejected on the sheet 1 from the inkjet head 3 according to the record data.

With this configuration, the recording of the color patterns for color measuring comprising the pattern rows for obtaining the color measuring data is performed to the sheet. As the recording is completed, the drying and the color measuring operations are performed.

The drying and the color measuring operations are controlled as follows. First, the sheet on which the color patterns for color measuring are recorded is conveyed to a drying region of the measuring unit by driving the sheet conveying motor 306, wherein a drive of the blower fan 14 is started through the control component 402. Since the degree of the drying depends on a kind and size of the sheet, a density of a record image, a temperature, a humidity and the like, a predetermined time used for the drying is determined based upon a control table stored in the ROM 301 in advance.

After the drying for the predetermined time, the sheet is conveyed such that the pattern row dried in the drying region of the measuring unit comes to the color measuring region of the measuring unit. Next, the color measuring carriage motor 420 is driven to cause the color measuring carriage 401 having mounted the color measuring sensor thereon to scan the sheet in the width direction and to obtain color measuring data of the pattern row. The color measuring data of the single pattern row is obtained by a single scan. The scan and the intermittent conveyance of the sheet are repeated according to the number of the pattern rows to obtain the color measuring data of all the pattern rows dried by the aforementioned drying operation.

In a case where the pattern rows in the color patterns for color measuring are recorded over a length of the drying region of the measuring unit in the sheet conveying direction, the not-dried region of the pattern rows not dried by the aforementioned drying operation is present. In this case, the drying and the color measuring operations are likewise performed to the pattern rows in the not-dried region. These operations are repeated as needed to obtain color measuring data of all pattern rows in the color patterns for color measuring.

The color measuring data obtained as described above is transferred to the CPU 300, and is stored as color measuring information in the RAM 304. The color measuring information is sent to the host computer 302, which will be used as the subsequent color correcting information.

After completion of the color measuring operation, the drive of the blower fan 14 is stopped through the control component 402. The sheet is conveyed until a position of the sheet to be cut comes to a cutting position of the cutter 4, and the sheet cut by the cutter 4 is discharged inside the discharge basket.

An explanation will be made of the first embodiment in the present invention based upon the above configuration. In the present embodiment, the recovering operation of the inkjet head is performed at timing from the recording operation of the color pattern for color measuring to the color measuring operation.

Figure 6:
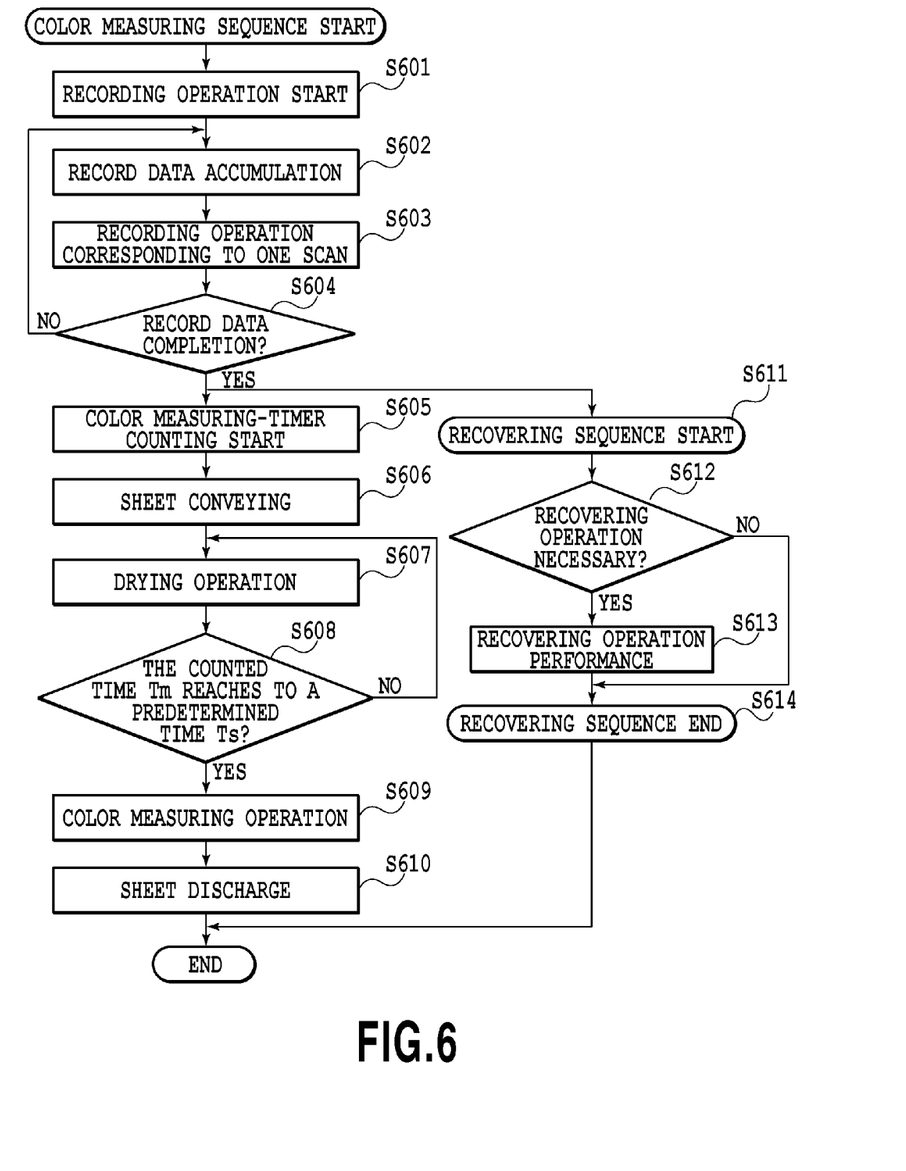
FIG. 6 is a flow chart showing a color measuring sequence according to the first embodiment.

FIG. 6 shows a flow chart of a color measuring sequence in the first embodiment in the present invention. In regard to the color measuring sequence, there are shown a series of operations including recording of the color pattern for color measuring which is performed for obtaining color measuring information used as color correcting information for color calibration, conveying, drying and color measuring of the sheet on which the color pattern for color measuring is recorded, and recovery of the inkjet head. In the present embodiment, the recovery of the inkjet head is indicated as an operation of a recovering sequence branched from a main stream of the color measuring sequence to be in parallel to the main stream.

As a command of performing the color measuring sequence is input by the operation panel 25 in the recording apparatus 100, at step S601 a recording operation is first started. At step 602 the inkjet head 3 waits until record data corresponding to a single scan of the inkjet head 3 is accumulated in a print buffer. When the record data is accumulated, at step S603 a recording operation corresponding to a single scan of the inkjet head 3 is performed to the sheet positioned in the recording region of the inkjet head 3, based upon the accumulated record data. Next, at step S604 it is determined whether or not the accumulation of the record data in regard to an entire image of the color patterns for color measuring to be recorded is completed. In a case where the negative determination is made, that is, in a case where the accumulation of the data to be recorded is not completed, the process goes back to step S602 where the accumulation of the record data and the recording operation continue to be performed. The intermittent conveyance of the sheet 1 required for recording the image is performed between a plurality of recording operations. Step S602 to step S604 are repeated until the accumulation of the record data of the entire image of the color patterns for color measuring to be recorded is completed. In a case where at step S604 it is determined that the accumulation of the record data of the entire image of the color patterns for color measuring to be recorded is completed, the process goes to step S605, and at the same time, also to step S611. In a series of steps from step S605 to step S610, the operations of the original color measuring sequence, that is, the subsequent operations for obtaining color measuring information as color correcting information for color calibration are performed. In addition, in a series of steps from step S611 to step S614, a recovering sequence, that is, a recovering operation for normalizing the inkjet head is performed. In the present embodiment, the operation of the recovering sequence after step S611 is performed at timing at least partially overlapping the operations of the color measuring sequence after step S605 to be in parallel thereto. The details will be described later with reference to FIG. 8.

Here, operations from step S605 to step S610 included in the original color measuring sequence will be explained.

At step S605 counting by a color measuring timer is started at a point where the recording operation is completed. Subsequently at step S606 the sheet 1 on which the color pattern for color measuring is recorded is conveyed to the drying region of the measuring unit U. At step S607 the drying operation by the measuring unit U is performed. At step S608 in a case where time Tm counted by the color measuring timer does not reach a predetermined time Ts, the process goes back to step S607, wherein the drying operation continues to be performed. In the present embodiment, the predetermined time Ts is set to two minutes.

Here, the predetermined time Ts is a constant time set as a time required for drying ink until a color of the ink becomes stable, according to various pieces of information. An example of the various pieces of information includes a kind of the color pattern for color measuring, a kind of the sheet, a kind of ink, a record density, a record duty (corresponding to an ink amount to be applied), temperature and humidity of the circumferential environment, and the like. The predetermined time Ts is set based upon at least one of these pieces of the information. In a case of changing color patterns or sheets in use, a predetermined time Ts suitable for each color pattern to be recorded or each sheet to be used is set. The predetermined time Ts may be determined by a numerical value stored in the main body of the recording apparatus 100 in advance, but is not limited thereto. For example, it can be changed based upon the circumferential environment of the recording apparatus 100 or designated to any value by a user.

In the present embodiment, the counting by the color measuring timer starts at a point where the recording operation of the color measuring pattern is completed, but the point of the counting start by the color measuring timer is not limited thereto. For example, considering the time required for conveying the sheet 1 from the recording region of the inkjet head 3 to the drying region of the measuring unit U, the counting by the color measuring timer may start at a point where a conveying operation of the sheet 1 subsequent to the recording operation of the color measuring pattern is completed. In this case, a numerical value found by subtracting the time required for conveying the sheet 1 from the recording region to the drying region from the set value of the predetermined time Ts in the aforementioned embodiment is set as a value of a predetermined value of the color measuring timer. The time required for the conveyance is determined by a conveying speed or the like of the recording apparatus 100.

In addition, in the present embodiment, as described later, after the time counted by the color measuring timer reaches the predetermined time Ts, the conveying operation for conveying the sheet 1 to the color measuring position is performed. However, considering the time required for conveying the sheet 1 from the drying region to the color measuring region and a degree of the drying advancing during this time, a numerical value found by subtracting the above time from the time substantially required for the drying until the ink color is stabilized may be set to the predetermined time Ts of the color measuring timer.

At step S608 in a case where the counted time Tm reaches the predetermined time Ts, at step S609 the dried sheet 1 is conveyed to the color measuring region of the measuring unit U to start the color measuring operation. In detail, the pattern rows constituting the color patterns for color measuring are measured in color one row by one row, and the color measuring operation continues to be performed until the pattern rows are all measured in color. The required intermittent conveyance of the sheet 1 is performed between the respective color measuring operations of the plurality of the pattern rows. After the color measuring operations are completed, at step S610 the sheet 1 is cut by the cutter 4, and a discharging operation of the sheet 1 is performed. In this way the color measuring sequence is completed.

Next, the operations from step S611 to step S614 forming the recovering sequence will be explained.

At step S611 the recovering sequence starts at the same timing as the timing of starting the aforementioned step S605. First, at step S612 it is determined whether or not it is necessary to perform the recovering operation of the inkjet head. In a case where at step S612 it is determined that the recovering operation is necessary, the process goes to step S613, wherein the recovering operation is performed. After the recovering operation is completed, the recovering sequence is completed at step S614. On the other hand, in a case where at step S612 it is determined that the recovering operation of the inkjet head is not necessary, immediately the process goes to step S614, wherein the recovering operation is completed.

Here, an example of a recovering sequence applicable to an embodiment according to the present invention will be in detail described with reference to FIG. 7. In the recovering sequence in the present example, the recovering operations for normalizing the inkjet head to recover the performance include a suction operation, wiping, and preliminary ejection.

Figure 7:
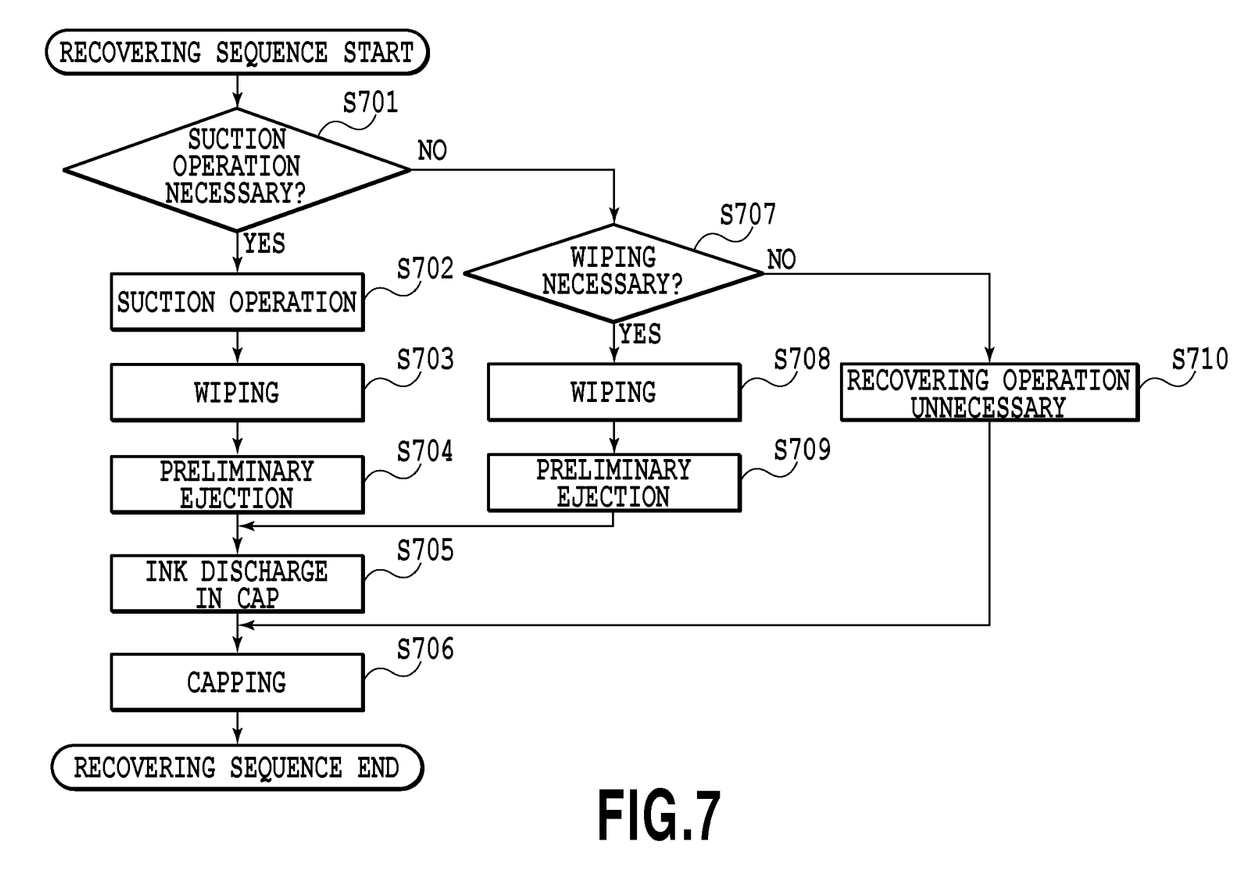
FIG. 7 is a flowchart showing a recovering sequence according to the first embodiment.

Referring to FIG. 7, first, at step S701 it is determined whether or not it is necessary to perform the suction operation depending upon the history in regard to the recording operation of the inkjet head 3. In the present embodiment, the ejection number of ink (ejection number of ink droplets) from an ejection opening of the inkjet head is used as the history of the recording operation as the determination reference. In a case where, even in regard to a single color among colors of inks which the recording apparatus 100 can eject, the ejection number of ink droplets from the ejection opening of the inkjet head reaches $10^{10}$ of dots, it is determined that the suction operation is necessary. This ejection number can be set to a number of times that leads to a possibility that, if the ejection continues to be performed without performing the suction operation, air remains in the inkjet head or the ink which cannot be removed completely by wiping remains on a face on which the ejection openings of the inkjet head line up, so that the normal ejection cannot be performed.

In a case where at step S701 it is determined that it is necessary to perform the suction operation of the inkjet head 3, the process goes to step S702, wherein the suction operation is performed. Specifically a pump of a recovery unit 28 is operated in a state where the face of the inkjet head 3 is capped by the cap 31, and thereby the ink and air inside the inkjet head 3 are suctioned for discharge. After the suction operation is completed, the process goes to step S703, wherein the wiping of the inkjet head 3 is performed. Specifically a rubber wiper 29 frictionally wipes the face on which the ejection openings of the inkjet head 3 line up to remove the ink having adhered to the face. After the wiping is completed, the process goes to step S704, wherein a preliminary ejection is performed. The preliminary ejection herein is an operation for discharging inks of other colors, inks of increased viscosity, and/or fine foreign objects entering into the ejection openings of the inkjet head 3 or in the vicinity of the ejection openings. Specifically ink droplets are ejected by a predetermined dot number toward the inside of the cap 31 opposing the face, from each of the ejection openings which line up on the face of the inkjet head 3. In the present example, the predetermined dot number is set to 10000 dots. Next, the process goes to step S705, wherein a discharging operation for discharging the ink received inside the cap 31 is performed. In the present step, the pump 33 of the recovery unit 28 is operated in a state where the cap 31 is separated from the inkjet head 3, and thereby the ink discharge inside the inkjet head 3 can be realized. After the ink inside the inkjet head 3 is discharged, the pump 33 is stopped. The process goes to step S706, wherein capping of covering the inkjet head 3 with the cap 31 is performed to complete the recovering sequence.

In the present example, in a case where the suction operation is performed based upon the determination at step S701 a time required from a point of starting the suction operation at step S702 to a point of completing the capping at step S706 is five minutes or slightly more including the determination time.

On the other hand, in a case where at step S701 it is determined the it is not necessary to perform the suction operation of the inkjet head 3, that is, in a case where in any ink color, the ejection number of ink droplets from the ejection opening of the inkjet head 3 does not reach $10^{10}$ of the dots, the process goes to step S707.

At step S707 it is determined whether or not it is necessary to perform the wiping. Similarly herein, the ejection number of ink (ejection number of ink droplets) from an ejection opening of the inkjet head is used as the determination reference. In a case where even in regard to a single color among colors of inks which the recording apparatus 100 can eject, the ejection number of ink droplets from the ejection opening of the inkjet head reaches $10^8$ of dots, it is determined that it is necessary to perform the wiping. In a case where at step S707 it is determined that the wiping is necessary, the process goes to step S708, wherein the wiping is performed. After performing the wiping, the process goes to step S709, wherein as similar to a case of step S704, herein, however, the preliminary ejection for ejecting ink droplets of 1000 dots from each ejection opening is performed. Next, the process goes to step S705, wherein the discharging operation of the ink ejected into the cap 31 is performed. After step S705 is completed, the process goes to step S706 as it is, wherein the capping of the inkjet head 3 is performed to complete the recovering sequence.

In the present example, in a case where the wiping is performed without performing the suction operation based upon the determinations at step S701 and step S707, a time required from a point of starting the wiping at step S708 to a point of completing the capping at step S706 is approximately one minute including the determination time.

On the other hand, in a case where at step S707 it is determined that the wiping is not necessary, the process goes to step S710, wherein it is determined that the recovering operation is not necessary. Next, the process goes to step S706, wherein the capping of the inkjet head 3 is performed to complete the recovering sequence.

As described above, an explanation is made of one example of the recovering sequence applicable to the present embodiment. In the aforementioned example, in regard to the reference for determining whether or not the suction operation or the wiping is necessary, the ejection number of the ink (that is, the number of ink droplets or the dot number) from the ejection opening is used, but the history of the recording operation used for the determination reference is not limited thereto. For example, it is possible to make the determination on the necessity of the suction operation or the wiping based upon an elapse time from the previous suction operation. Further, both of the ejection number and the elapse time may be used as the determination reference.

In addition, the content of the recovering operation is not limited to the content described in the aforementioned example. For example, a plurality of suction operations or wiping operations may be performed.

Here, FIG. 8A and FIG. 8B respectively show a timing chart of a color measuring sequence of each of a virtual comparative example and the first embodiment, with which a particular effect according to the first embodiment will be explained.

Figure 8A:
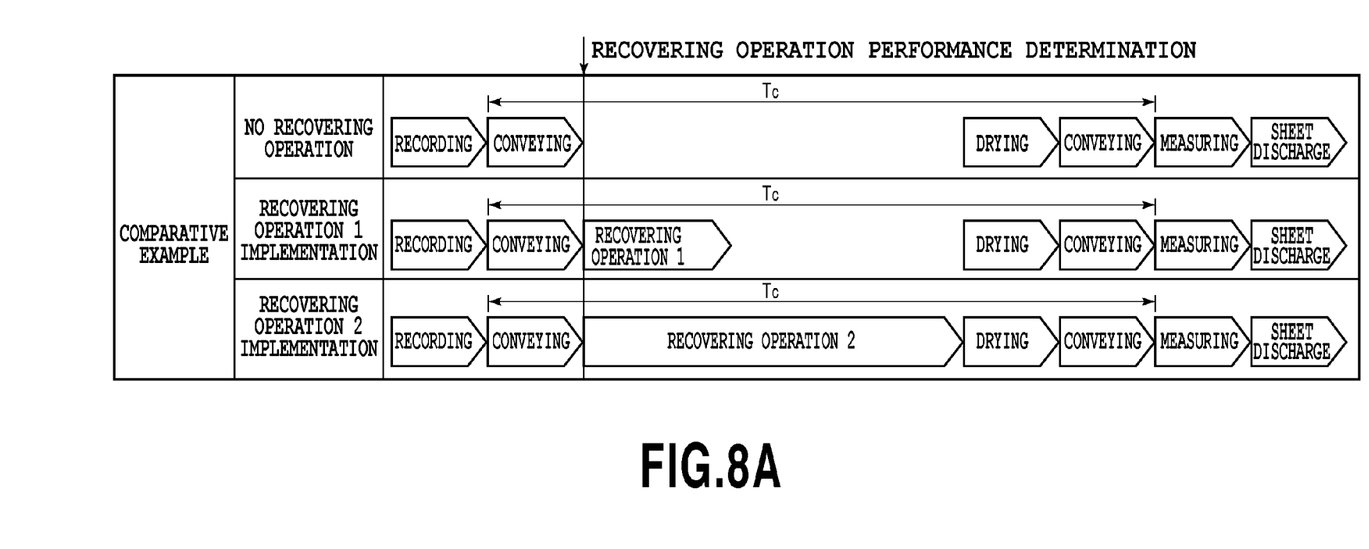
FIG. 8A is a timing chart showing a color measuring sequence according to a virtual comparative example.
Figure 8B:
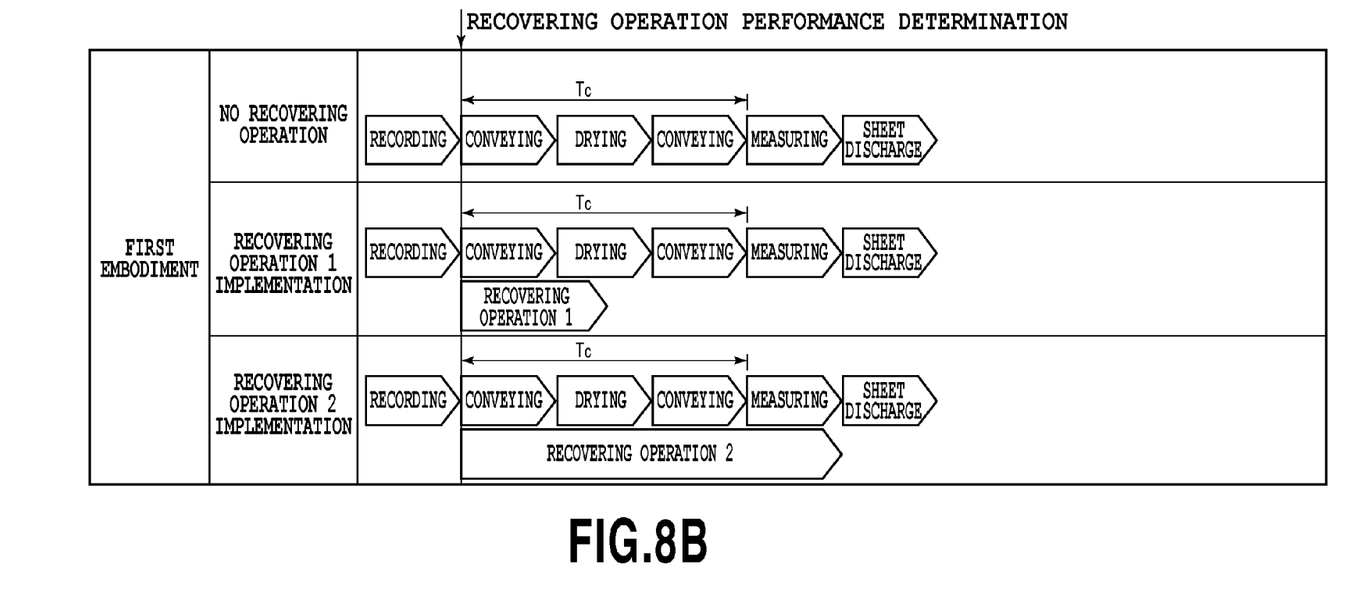
FIG. 8B is a timing chart showing the color measuring sequence according to the first embodiment.

In the chart in each of FIG. 8A and FIG. 8B, a recovering operation 1 corresponds to a recovering operation composed of a series of operations from step S708 to step S706, which is performed when it is determined at step S707 in FIG. 7 that the wiping is necessary. In the aforementioned example, the required time is approximately one minute including the time for the determinations at step S701 and step S707. A recovering operation 2 corresponds to a recovering operation composed of a series of operations from step S702 to step S706, which is performed when it is determined at step S701 in FIG. 7 that the suction operation is necessary. In the aforementioned example, the required time is five minutes or slightly more including the time for the determination at step S701.

First, in the first embodiment shown in FIG. 8B, in a point where the recording operation of the color measuring pattern is completed, the determination on the presence/absence of the necessity of a recovering operation of the inkjet head and on the kind of the recovering operation of the inkjet head in a case where a recovering operation is performed is made. In a case where it is determined that it is not necessary to perform the recovering operation based upon the determination result, the recovering operation is not performed, and in a case where it is determined that it is necessary to perform the recovering operation, the determined recovering operation is performed. At this time, regardless of the presence/absence and the kind of the recovering operation, after the recording operation is completed, the conveying operation (first conveying operation) of conveying the sheet to the drying region, the drying operation, and a conveying operation (second conveying operation) of conveying the sheet to the color measuring region are performed. That is, in the present embodiment, the conveying operation, the drying operation and the color measuring operation of the sheet in the original color measuring sequence, and the recovering operation of the inkjet head in the recovering sequence are performed at at least partially overlapping timing.

On the other hand, in the virtual comparative example shown in FIG. 8A, when the recording operation of the color measuring pattern is completed, the sheet is conveyed to the drying region. In a point where this conveying operation is completed, the aforementioned determination on the recovering operation of the inkjet head is made. In a case where it is determined that it is not necessary to perform the recovering operation based upon the determination result, the drying operation is performed without performing the recovering operation, and next, the conveying operation of conveying the sheet to the color measuring region is performed. In a case where it is determined that it is necessary to perform the recovering operation based upon the determination result, the determined recovering operation is performed, and the drying operation is performed after the recovering operation is completed. Next, the conveying operation of conveying the sheet to the color measuring region is performed. In this way, in the virtual comparative example, the respective operations after the recording operation is completed, that is, the conveying operation, the drying operation, the color measuring operation, and the recovering operation (case of performing it) are serially performed at individual timings without synchronization.

Here, the present invention has the subject of appropriately setting the time from a point of recording completion of the color pattern for color measuring to a point of start of the color measuring operation in consideration of performing the recovering operation for more stable color pattern formation of color measuring. Therefore in the present invention, the time from the recording operation completion to the color measuring operation start is set to a constant time Tc for making the drying degree of the recorded ink at a color measuring time constant.

Since the respective operations after the recording operation are serially performed at individual timings in the comparative example, the constant time Tc cannot be set smaller than the time found by adding the time required for the estimated longest recovering operation to the time required for the conveying operation and the drying operation which are necessary without a fail. On the other hand, in the first embodiment of the present invention, the recovering operation of the inkjet head is performed at timing at least partially synchronized with the operations of the color measuring sequence after the recording operation. Therefore according to the first embodiment, the constant time Tc set as the time from the recording completion to the color measuring start of the color measuring pattern can be set shorter than that of the comparative example.

As described above, the first embodiment is characterized in that the recovering operation of the inkjet head is performed at timing after the recording operation is completed and at least partially overlapping at least one of the conveying operation, the drying operation and the color measuring operation in synchronization therewith. That is, a plurality of the operations after the recording operation completion, which would be possibly serially performed at individual timings, are performed at at least partially overlapping timings. Therefore according to the first embodiment, the time from the recording operation completion to the color measuring operation start can be kept constant, while setting the time to be relatively short.

Hereinafter, the explanation in common to that of the first embodiment is omitted, while the second embodiment will be explained.

The second embodiment is the same as the first embodiment except that in the color measuring sequence shown in FIG. 6, the value of the set time Ts of the color measuring timer at step S608 is different from that of the first embodiment. In detail, the set time Ts of the color measuring timer is set to two minutes in the first embodiment, but is set to five minutes in the second embodiment. The other conditions such as the configuration of the apparatus, the color measuring and recovering sequences and the operations in the second embodiment are the same as those of the first embodiment. That is, since the conveying speed of the sheet in the second embodiment is the same as that of the first embodiment, the second embodiment differs in a point of the drying time from the first embodiment.

According to studies by the inventors, it is found out that there are some cases where when the color measuring operation is performed in the middle of performing the recovering operation, the color measuring result is not stable. In regard to a specific factor causing the above event, an entirety of the recording apparatus 100 vibrates by the recovering operation although slightly. Thereby, there is a possibility that, for example, a distance between the color measuring sensor and the face of the sheet to be color-measured varies to affect the color measuring result.

Figure 9:
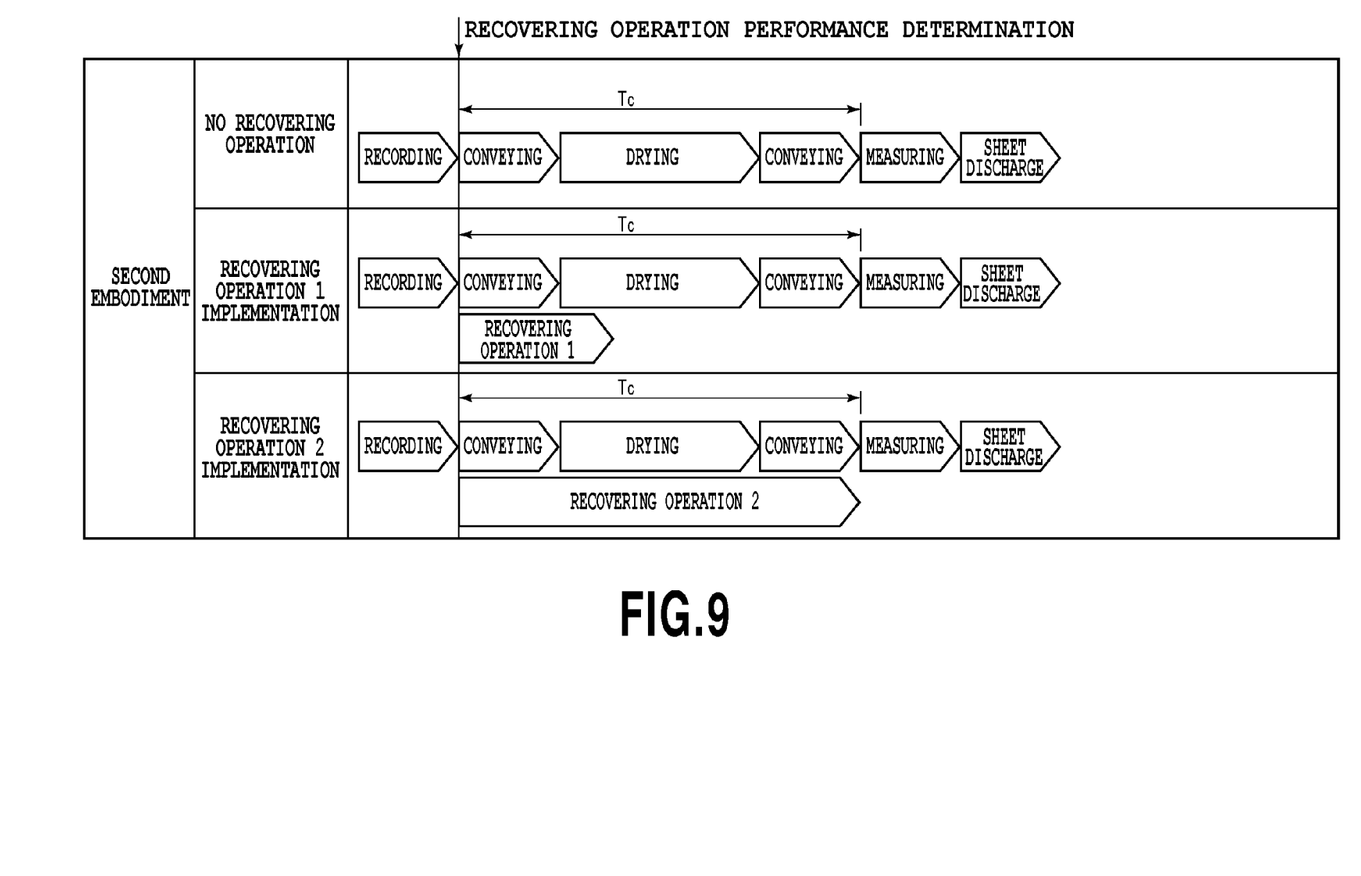
FIG. 9 is a timing chart showing a color measuring sequence according to a second embodiment.

FIG. 9 shows a timing chart of the color measuring sequence in the second embodiment. In the present embodiment, a constant time Tc set as the time from the recording operation completion to the color measuring operation start is set to a time slightly over five minutes as the time of the recovering operation 2 as the time of the estimated longest recovering operation. Next, a predetermined time Ts of the color measuring timer for realizing the constant time Tc from the recording operation completion to the color measuring operation start is set to five minutes in consideration of the conveying time for conveying the sheet from the drying region to the color measuring region. In this way, the recovering operation is controlled not to be operated at the same time as the color measuring operation.

As described above, the second embodiment is characterized in that the recovering operation of the inkjet head is performed at timing from a point of the recording operation completion to a point of the color measuring operation start and at least partially overlapping at least one of the conveying operation and the drying operation. That is, a plurality of the operations after the recording operation completion, which would be possibly serially performed at individual timings, are performed at at least partially overlapping timings. Therefore according to the second embodiment, the time from the recording operation completion to the color measuring operation start can be kept constant, while setting the time to be relatively short. In addition, according to the second embodiment, the recovering operation of the inkjet head is controlled to be completed until the color measuring operation starts, and therefore the recovering operation and the color measuring operation are not performed simultaneously. As a result, the more stable color measuring result can be obtained.

In the second embodiment, the drying time is, by comparing the shortest time required for obtaining a stable color measuring result with the time required for the recovering operation of the inkjet head performed in the middle of the color measuring sequence to be completed before starting the color measuring operation, preferably set to the longer time. However, the drying time may be set to be longer than the longer time.

In the first and second embodiments, an explanation is made of the example of recording the color pattern for color measuring by a single recording operation to perform the color measuring sequence, but also in a case of the configuration of performing the recording operation, the drying operation, and the color measuring operation in order on a plurality of the color patterns for color measuring, the present invention may be applied. In this case, timings of performing the recovering operation of the inkjet head and the respective operations of a plurality of the color measuring sequences overlap as needed, therefore making it possible to shorten the time from the recording operation completion to the color measuring operation start.

In the first and second embodiments, an explanation is made of the example of performing the recovering operation of the inkjet head after the recording operation is completed. For obtaining the further time-shortening effect of an entire color measuring sequence, the recovering operation of the inkjet head may be performed before the recording operation start of the color pattern for color measuring or in the middle of discharging the sheet from the recording apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-103706, filed Apr. 27, 2012, which is hereby incorporated by reference herein in its entirety.

What is claimed is:

1. A recording apparatus comprising:
a recording unit configured to apply ink on a sheet by a printing head to perform recording;
a drying unit configured to dry the sheet on which recording was performed by the recording unit;
a measuring unit configured to measure colors of color patterns on the sheet;
a conveying unit configured to convey the sheet;
a recovering unit configured to perform a recovering operation for the printing head; and
a control unit configured to control the apparatus such that the recording apparatus performs a recording operation to form color patterns, the conveying unit performs a first conveying operation to convey the sheet from a recording region of the recording unit to a drying region of the drying unit, the drying unit performs a drying operation, the conveying unit performs a second conveying operation to convey the sheet from the drying region to a measuring region of the measuring unit, and the measuring unit performs a measuring operation, in sequence,
wherein the recovering operation is performed at timing after the recording operation and at least partially overlapping at least one of the first conveying operation, the second conveying operation, and the drying operation, and
wherein the recovering operation is not performed at timing overlapping the color measuring operation.

2. A recording apparatus according to claim 1, wherein a time from a point where the recording operation by the recording unit is completed to a point where the color measuring operation by the measuring unit is started is set by at least one of pieces of information of a kind of the color patterns to be recorded, a kind of the sheet, a kind of ink, a record density, a record duty, and a time required for the recovering operation of the printing head.

3. A recording apparatus according to claim 1, wherein the control unit determines whether or not the recovering operation by the recovering unit is necessary, based upon information of a history of the recording operation of the printing head.

4. A recording apparatus according to claim 3, wherein the information of the history of the recording operation of the printing head includes at least one of an elapse time since the previous recovering operation was performed and the ink ejection number of ink droplets from the printing head since the previous recovering operation was performed.

5. A recording apparatus comprising:
a recording unit configured to apply ink on a sheet by a printing head to perform recording;
a drying unit configured to dry the sheet on which recording was performed by the recording unit;
a measuring unit configured to measure colors of color patterns on the sheet during a color measuring operation;
a conveying unit configured to convey the sheet;
a discharging unit configured to discharge the sheet after the color measuring operation;

a recovering unit configured to perform a recovering operation for the printing head; and a control unit configured to control the apparatus such that the recording apparatus performs a recording operation to form color patterns, the conveying unit performs a first conveying operation to convey the sheet from a recording region of the recording unit to a drying region of the drying unit, the drying unit performs a drying operation, the conveying unit performs a second conveying operation to convey the sheet from the drying region to a measuring region of the measuring unit, and the measuring unit performs the color measuring operation, in sequence, wherein the recovering operation is performed at timing after the recording operation and at least partially overlapping at least one of the first conveying operation, the second conveying operation, the drying operation, and the color measuring operation, and wherein the recovering operation is allowed to be performed during discharging by the discharging unit.

6. A color measuring method for a recording apparatus comprising:

a recording step for applying ink on a sheet by a printing head to record color patterns thereon;

a drying step for drying the sheet on which the color patterns are recorded by the recording step;

a measuring step for measuring the color patterns on the sheet dried by the drying step; and a recovering step for performing a recovering operation for the printing head, wherein the recovering operation is performed at timing after the recording step and at least partially overlapping the drying step, and wherein the recovering operation is not performed at timing overlapping the color measuring step.

7. A color measuring method according to claim 6, wherein a time from a point where the recording step is completed to a point where the color measuring step is started is set by at least one of pieces of information of a kind of the color patterns to be recorded, a kind of the sheet, a kind of ink, a record density, a record duty, and a time required for the recovering operation of the printing head.

8. A color measuring method according to claim 6, further comprising:

a determining step of determining whether or not the recovering operation is necessary based upon information of a history of the recording operation of the printing head.

9. A color measuring method according to claim 8, wherein the information of the history of the recording operation of the printing head includes at least one of an elapse time since the previous recovering operation was performed and the ink ejection number of ink droplets from the printing head since the previous recovering operation was performed.

10. A color measuring method for a recording apparatus comprising:

a recording step for applying ink on a sheet by a printing head to record color patterns thereon;

a drying step for drying the sheet on which the color patterns are recorded by the recording step;

a measuring step for measuring the color patterns on the sheet dried by the drying step;

a discharging step for discharging the sheet after the color measuring step; and a recovering step for performing a recovering operation for the printing head, wherein the recovering operation is performed at timing after the recording step and at least partially overlapping at least one of the drying step and the color measuring step, and wherein the recovering operation is allowed to be performed during the discharging step.

* * * * *